US012594991B2

(12) United States Patent
Yoshikawa et al.

(10) Patent No.: US 12,594,991 B2
(45) Date of Patent: Apr. 7, 2026

(54) CRAWLER-TYPE WORK MACHINE

(71) Applicant: KOMATSU LTD., Tokyo (JP)

(72) Inventors: Takeshi Yoshikawa, Tokyo (JP);
Hiroaki Takeshima, Tokyo (JP); **Naoya
Akiyama, Tokyo (JP); Kazushi
Nakata, Tokyo (JP); Osamu Yatsuda**,
Tokyo (JP); Shinichi Otaka, Tokyo
(JP); Yuji Nameki, Tokyo (JP);
Ryouichi Nagasaka, Tokyo (JP);
Takaomi Komura, Tokyo (JP)

(73) Assignee: KOMATSU LTD., Tokyo (JP)

( * ) Notice: Subject to any disclaimer, the term of this
patent is extended or adjusted under 35
U.S.C. 154(b) by 431 days.

(21) Appl. No.: 18/253,633

(22) PCT Filed: Nov. 5, 2021

(86) PCT No.: PCT/JP2021/040823
§ 371 (c)(1),
(2) Date: May 19, 2023

(87) PCT Pub. No.: WO2022/137836
PCT Pub. Date: Jun. 30, 2022

(65) Prior Publication Data
US 2024/0001988 A1 Jan. 4, 2024

(30) Foreign Application Priority Data

Dec. 25, 2020 (JP) ................................. 2020-216762

(51) Int. Cl.
B62D 11/08 (2006.01)
B62D 11/00 (2006.01)
(Continued)

(52) U.S. Cl.
CPC ............ B62D 11/08 (2013.01); B62D 11/001
(2013.01); B62D 11/12 (2013.01); E02F 9/225
(2013.01)

(58) Field of Classification Search
CPC ....... B62D 11/08; B62D 11/001; B62D 11/12;
B62D 11/18; E02F 9/225; E02F 9/2267;
B60W 10/20
See application file for complete search history.

(56) References Cited

U.S. PATENT DOCUMENTS 8,844,665 B2 * 9/2014 Wenger ................ B62D 11/183
180/9.1
2002/0020579 A1 2/2002 Yamamoto et al.
(Continued)

FOREIGN PATENT DOCUMENTS

JP 53-27929 A 3/1978
JP 5-8753 A 1/1993
(Continued)

OTHER PUBLICATIONS

Espace translation of JP 2010-144598 A (Year: 2010).*
(Continued)

*Primary Examiner* — Jason D Shanske
*Assistant Examiner* — Scott Lawrence Strickler
(74) *Attorney, Agent, or Firm* — Spencer Fane LLP

(57) ABSTRACT
A controller provided in a bulldozer maintains the engage-
ment of an inside steering clutch over a predetermined
period beginning from a switching start point at which
switching starts, when switching from a slow turn mode to
a pivot turn mode, and when switching from the pivot turn
mode to the slow turn mode, maintains the braking of an
inside steering brake over a predetermined period beginning
from a switching start point at which the switching starts.

13 Claims, 6 Drawing Sheets

(51) Int. Cl.
    *B62D 11/12*         (2006.01)
    *E02F 9/22*         (2006.01)

(56)             References Cited

U.S. PATENT DOCUMENTS

2002/0193927 A1 * 12/2002 Nakagawa ........... B62D 11/183
                                                                 701/41
2005/0183416 A1 * 8/2005 Hayashi ................ E02F 9/2296
                                                                 60/445

FOREIGN PATENT DOCUMENTS

| | | | | |
|---|---|---|---|---|
| JP | 2001-260928 A | | 9/2001 | |
| JP | 2010144598 A | * | 7/2010 | |
| KR | 20170143301 A | * | 12/2017 | ............. A01D 69/08 |

OTHER PUBLICATIONS

Espace translation of KR 2017-0143301 A (Year: 2017).*
The International Search Report for the corresponding international
application No. PCT/JP2021/040823, issued on Jan. 18, 2022.

\* cited by examiner

CRAWLER-TYPE WORK MACHINE

CROSS-REFERENCE TO RELATED APPLICATIONS

This application is a U.S. National stage application of International Application No. PCT/JP2021/040823, filed on Nov. 5, 2021. This U.S. National stage application claims priority under 35 U.S.C. § 119(a) to Japanese Patent Application No. 2020-216762, filed in Japan on Dec. 25, 2020, the entire contents of which are hereby incorporated herein by reference.

TECHNICAL FIELD

The present disclosure relates to a crawler-type work machine.

BACKGROUND ART

Conventionally, there is known a crawler-type work machine (for example, a bulldozer or the like) that comprises left and right planetary gear mechanisms, left and right hydraulic drive steering clutches, left and right hydraulic drive steering brakes, and a turning motor (see Japanese Patent Laid-open No. S53-27929).

The left and right planetary gear mechanisms are disposed between an input shaft and left and right output shafts. The left and right steering clutches are able to rotate about the input shaft and switch between transmitting and blocking rotational power from the input shaft to the left and right output shafts by means of the left and right planetary gear mechanisms. The left and right steering brakes brake the left and right output shafts. The turning motor causes the left and right steering clutches to rotate so that a rotation speed difference is produced between the left and right output shafts.

The crawler-type work machine described in Japanese Patent Laid-open No. S53-27929 turns in a slow turn mode by causing the left and right steering clutches to engage, causing the left and right steering brakes to release, and driving the turning motor.

The crawler-type work machine described in Japanese Patent Laid-open No. S53-27929 turns in a pivot turn mode by causing the inside steering clutch to release and causing the inside steering brake to brake.

SUMMARY

However, when switching from the slow turn mode to the pivot turn mode, it is necessary to cause the inside steering brake to brake after causing the inside steering clutch to release in order to prevent the phenomenon of dragging to occur on the inside steering brake. However, in the point that the braking force of the inside steering brake actually is produced after the inside steering clutch is released, the phenomenon of straight travel occurs and the turning radius temporarily increases with the inside crawler belt corotating due to the driving of the outside crawler belt.

Similarly, when switching from the pivot turn mode to the slow turn mode, it is necessary to cause the inside steering clutch to engage after causing the inside steering brake to release in order to prevent the phenomenon of dragging to occur on the inside steering brake. However, in the point that the inside steering clutch actually engages after the inside steering brake is released, the phenomenon of straight travel occurs and the turning radius temporarily increases with the inside crawler belt corotating due to the driving of the outside crawler belt.

An object of the present disclosure is to provide a crawler-type work machine that is able to suppress the temporary increase of the turning radius during at least one of switching from the slow turn mode to the pivot turn mode and switching from the pivot turn mode to the slow turn mode.

A crawler-type work machine according to an aspect of the present disclosure comprises left and right planetary gear mechanisms, left and right steering clutches, left and right steering brakes, a turning motor, and a controller. The left and right planetary gear mechanisms are disposed between an input shaft and left and right output shafts. The left and right steering clutches are configured to be able to rotate about the input shaft and switch between transmitting and blocking rotational power from the input shaft to the left and right output shafts by means of the left and right planetary gear mechanisms. The left and right steering brakes are configured to brake the left and right output shafts. The turning motor is configured to cause the left and right steering clutches to rotate so that a rotation speed difference is produced between the left and right output shafts. The controller is configured to control the left and right steering clutches, the left and right steering brakes, and the turning motor thereby causing the crawler-type work machine to turn in either a slow turn mode or a pivot turn mode. The left and right steering clutches and the left and right steering brakes are all driven by supplying hydraulic fluid. In the slow turn mode, the controller causes the left and right steering clutches to engage, causes the left and right steering brakes to release, and drives the turning motor so that, among the left and right output shafts, a rotation speed of an inside output shaft corresponding to the turning direction becomes lower than a rotation speed of an outside output shaft opposite to the turning direction. In the pivot turn mode, the controller causes an inside steering clutch corresponding to the turning direction among the left and right steering clutches to release, causes an inside steering brake corresponding to the turning direction among the left and right steering brakes to brake, and drives the turning motor so that the rotation speed of the inside output shaft becomes lower than the rotation speed of the outside output shaft. During at least one of switching from the slow turn mode to the pivot turn mode and switching from the pivot turn mode to the slow turn mode, the controller causes the inside steering clutch to engage or causes the inside steering brake to brake over a predetermined period after switching starts.

According to the present disclosure, there can be provided a crawler-type work machine that is able to suppress the temporary increase of the turning radius during at least one of switching from the slow turn mode to the pivot turn mode and switching from the pivot turn mode to the slow turn mode.

DESCRIPTION OF EMBODIMENTS (Configuration of Bulldozer 1)

Figure 1:
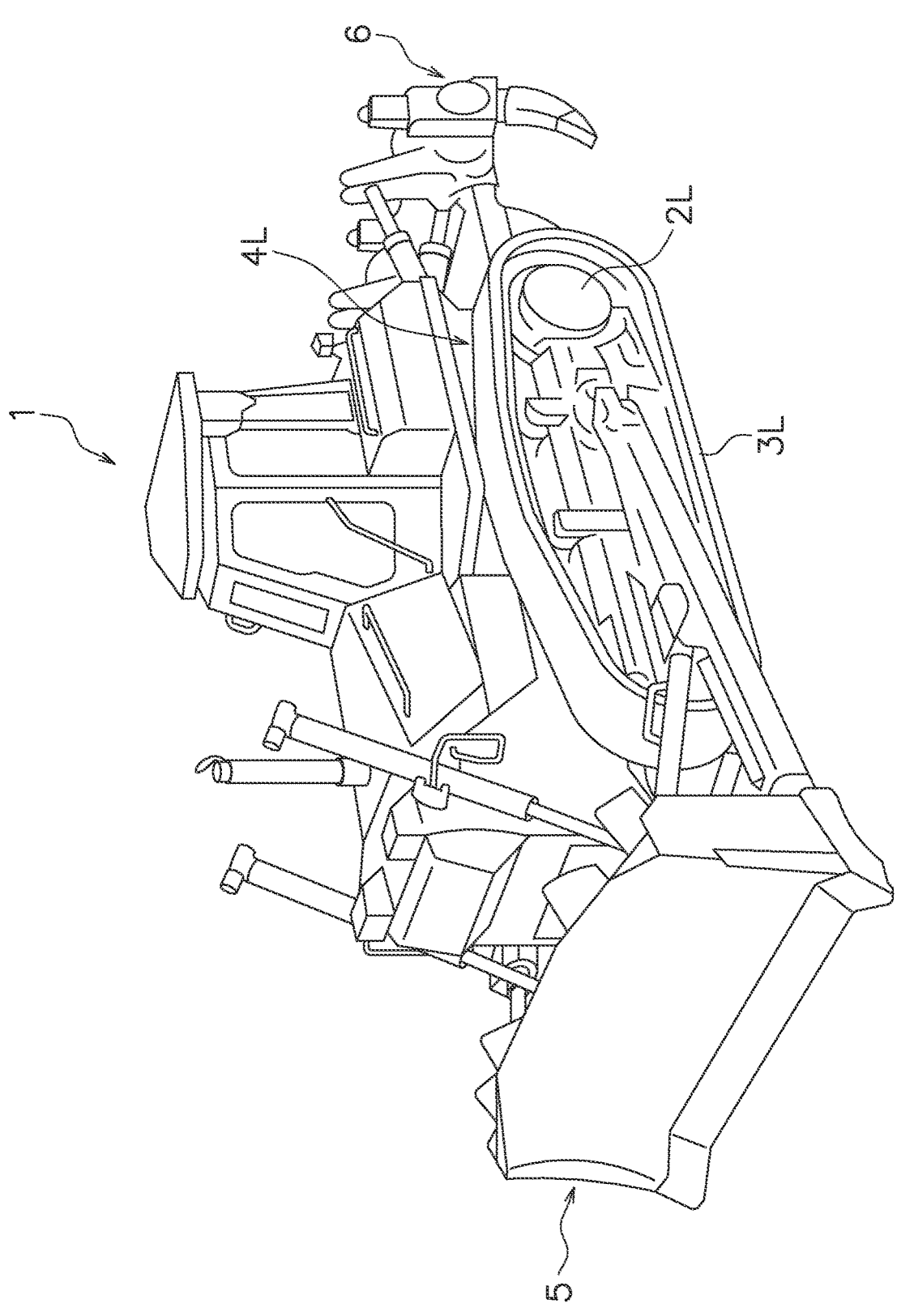
FIG. 1 is a perspective view of a bulldozer according to an embodiment.
Figure 2:
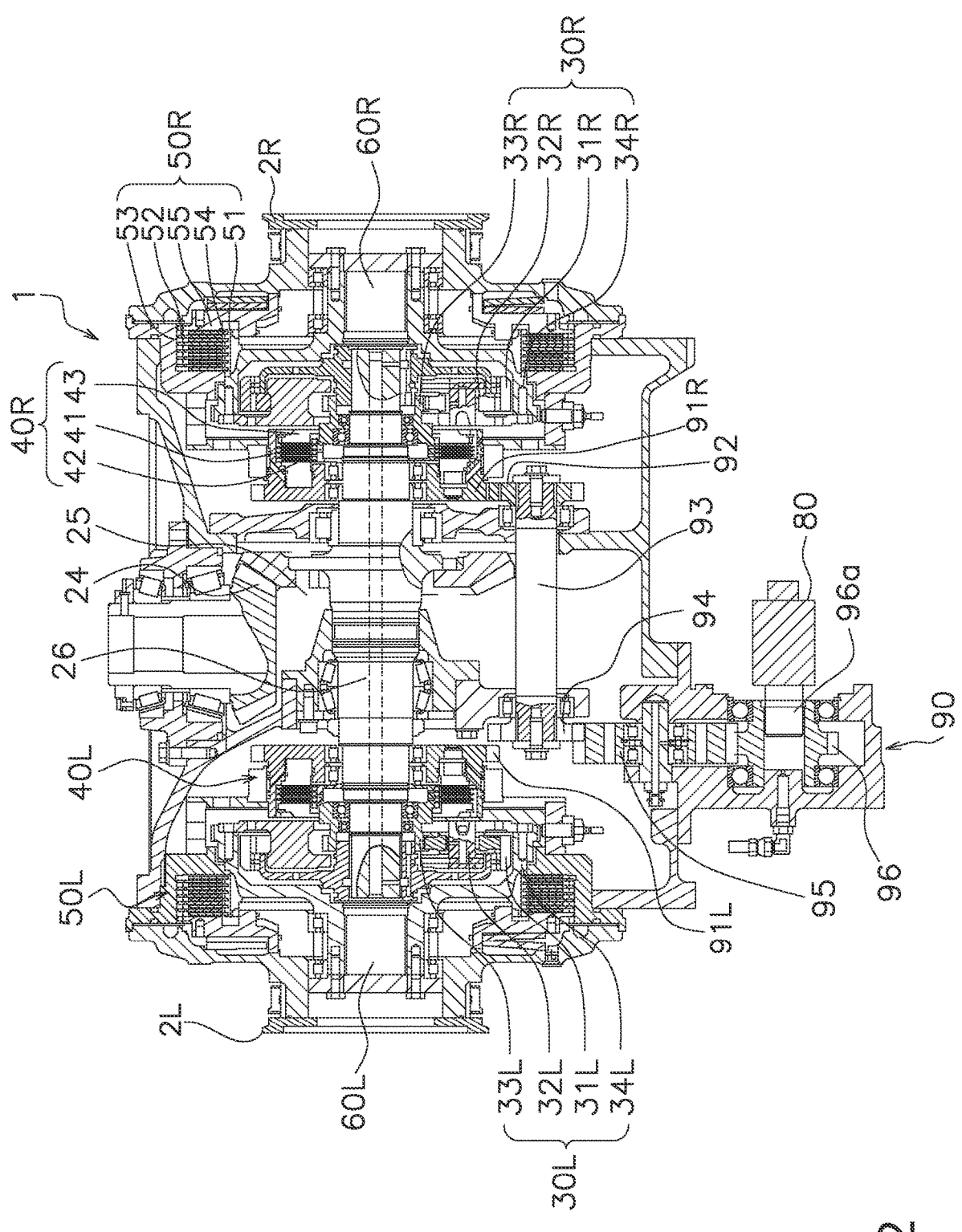
FIG. 2 is a cross-sectional configuration view of a power transmission system of the bulldozer according to the embodiment.
Figure 3:
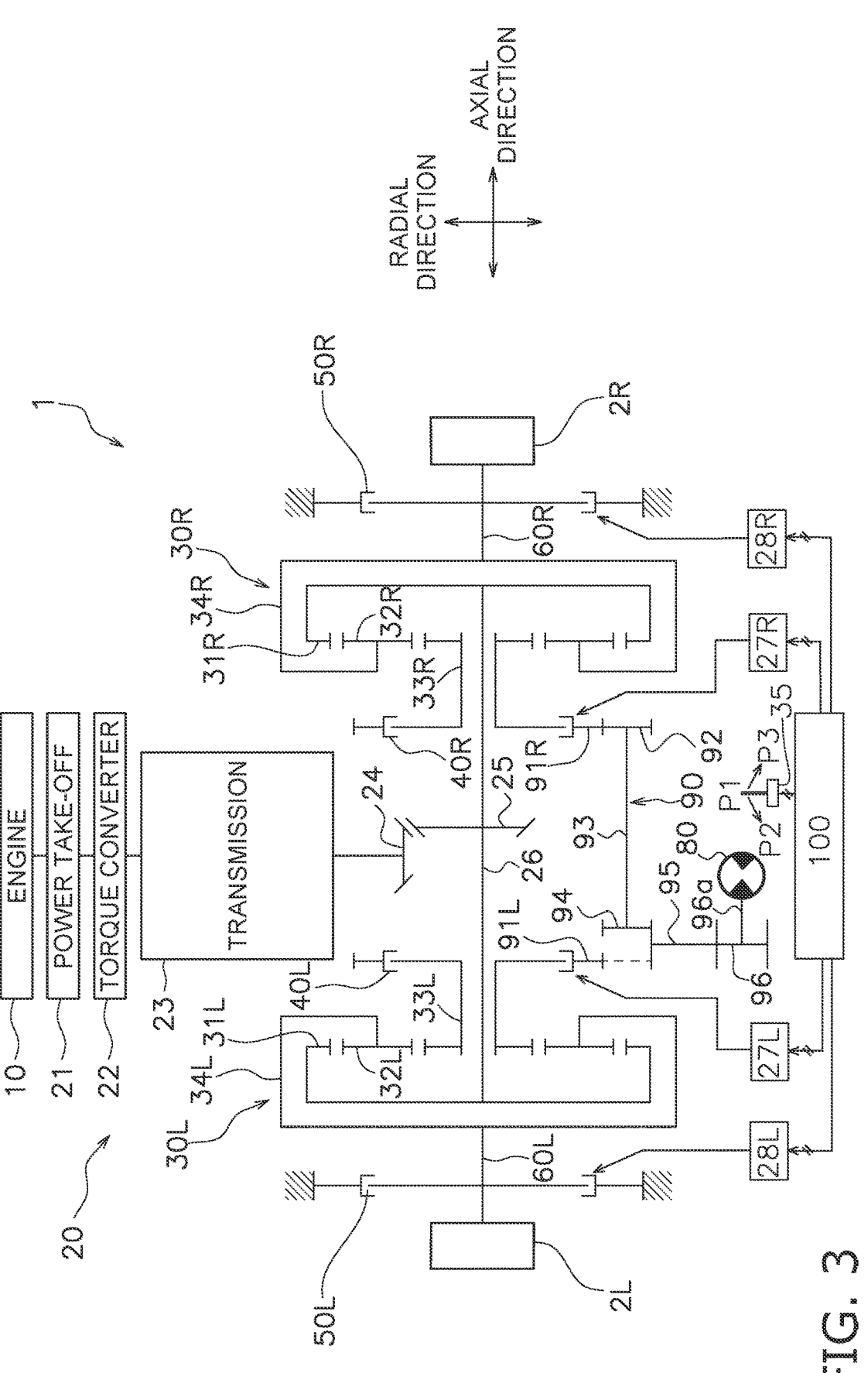
FIG. 3 is an outline system configuration view of the power transmission system of the bulldozer according to the embodiment.

FIG. 1 is a perspective view of a bulldozer 1 that is an example of the crawler-type work machine. FIG. 2 is a cross-sectional configuration view of the power transmission system of the bulldozer 1. FIG. 3 is an outline system configuration view of the power transmission system of the bulldozer 1.

As illustrated in FIG. 1, the bulldozer 1 is provided with left and right travel devices 4L, 4R that respectively have left and right sprockets 2L, 2R and left and right crawler belts 3L, 3R; a blade 5 provided to a vehicle front section; and a ripper device 6 provided to a vehicle rear section.

The bulldozer 1 is able to do work, such as pushing earth with the blade 5, and work, such as crushing and excavating with the ripper device 6.

As illustrated in FIGS. 2 and 3, the bulldozer 1 includes an engine 10, an engine power transmitting section 20, left and right planetary gear mechanisms 30L, 30R, left and right steering clutches 40L, left and right steering brakes 50L, 50R, left and right output shafts 60R, a turning motor 80, a motor power transmitting section 90, and a controller 100.

[Engine Power Transmitting Section]

The engine power transmitting section 20 transmits power from the engine 10 to the left and right planetary gear mechanisms 30L, The engine power transmitting section 20 includes a power take-off device 21, a torque converter 22, a transmission 23, a pinion 24, a bevel gear 25, and an input shaft 26.

The power transmission device 21 transmits power from the engine 10 to the torque converter 22. The torque converter 22 transmits the power of the engine 10 transmitted by the power take-off device 21 to the transmission 23 by means of a fluid. The transmission 23 has a plurality of velocity stage clutches for changing the rotational power transmitted from the torque converter 22, and a direction stage clutch for switching between forward travel and reverse travel. The transmission 23 is coupled to the pinion 24. The power from the transmission 23 is transmitted through the pinion 24 and the bevel gear 25 to the input shaft 26. The input shaft 26 extends in the left-right direction. The axial direction of the input shaft 26 has the same meaning as the left-right direction of the bulldozer 1.

[Planetary Gear Mechanism]

The left and right planetary gear mechanisms 30L, 30R are disposed between the input shaft 26 and the left and right output shafts 60L, 60R. The left and right planetary gear mechanisms 30L, 30R respectively have left and right ring gears 31L, 31R, left and right planetary gears 32L, 32R, left and right sun gears 33L, 33R, and left and right carriers 34L, 34R.

The left and right ring gears 31L, 31R are coupled to the input shaft 26. The left and right planetary gears 32L, 32R are respectively disposed on the inside of the left and right ring gears 31L, 31R in a radial direction perpendicular to the axial direction of the input shaft 26. The left and right planetary gears 32L, 32R respectively mesh with the left and right ring gears 31L, 31R and the left and right sun gears 33L, 33R. The left and right sun gears 33L, 33R are rotatably attached to the input shaft 26. The left and right sun gears 33L, 33R are respectively disposed on the inside of the left and right planetary gears 32L, 32R in the radial direction. The left and right sun gears 33L, 33R are respectively coupled to the left and right steering clutches 40L, 40R. The left and right sun gears 33L, 33R be able to connect and disconnect with the motor power transmitting section 90 (specifically, below-mentioned left and right clutch gears 91L, 91R) through the left and right steering clutches 40L, 40R. The left and right carriers 34L, 34R are respectively coupled to the left and right planetary gears 32L, 32R and the left and right output shafts 60L, 60R.

[Steering Clutch]

The left and right steering clutches 40L, 40R are respectively disposed between the left and right planetary gear mechanisms 30L, 30R and the motor power transmitting section 90. The left and right steering clutches 40L, 40R respectively be able to connect and disconnect the left and right sun gears 33L, 33R of the left and right planetary gear mechanisms 30L, 30R with the left and right clutch gears 91L, 91R of the motor power transmitting section 90.

The left and right steering clutches 40L, 40R are driven by supplying a hydraulic fluid. The left and right steering clutches 40L, 40R are configured by wet multiplate clutches that are able to be engaged and released. In the present embodiment, the left and right steering clutches 40R are positive-type hydraulic clutches. The left and right steering clutches 40L, 40R are released when hydraulic fluid is not supplied, are partially engaged when the pressure of the supplied hydraulic fluid is less than a predetermined value, and are completely engaged when the pressure of the supplied hydraulic fluid is equal to or greater than the predetermined value.

The pressure of the hydraulic fluid supplied to the left and right steering clutches 40L, 40R is controlled by the steering clutch control valves 27L, 27R. The left and right clutch control valves 27L, 27R are driven in response to a clutch pressure instruction inputted from the controller 100.

The left and right steering clutches 40L, 40R switch between transmitting and blocking the rotational force from the input shaft 26 to the respective left and right output shafts 60L, 60R by means of the respective left and right planetary gear mechanisms 30L, 30R.

Specifically, the rotation of the input shaft 26 is transmitted through the left ring gear 31L, the left planetary gear 32L, and the left carrier 34L to the left output shaft 60L when the left steering clutch 40L is engaged. Conversely, when the left steering clutch 40L is released, the left sun gear 33L enters a freely rotating state and the transmission of the rotational power from the input shaft 26 to the left output shaft 60L is blocked. Similarly, the transmission or blocking of the rotational power from the input shaft 26 to the right output shaft 60R is switched in response to the engagement or release of the right steering clutch 40R.

The left and right steering clutches 40L, 40R are able to rotate about the input shaft 26. The left and right steering clutches 40L, rotate in mutually opposite directions due to the rotational power from the turning motor 80 being transmitted through the motor power transmitting section 90.

For example, when the right steering clutch 40R rotates in reverse while the left steering clutch 40L rotates in the forward direction while the left and right steering clutches 40L, 40R are engaged, the rotation speed of the left output shaft 60L increases more than the rotation speed of the right output shaft 60R and the bulldozer 1 turns slowly to the right.

In the present description, a slow turn signifies that forward travel or reverse travel occurs such that an arc is drawn with a relatively large turning radius due to a rotation speed difference being produced between the left and right output shafts 60L, 60R that rotate in the same direction.

In addition, when the left steering clutch 40L rotates in the forward direction while the left steering clutch 40L is engaged and the right steering clutch 40R is released, the rotation of the right output shaft 60R is stopped and the left output shaft 60L rotates whereby the bulldozer 1 makes a pivot turn to the right. However, when the bulldozer 1 makes a pivot turn to the right, the right steering brake 50R brakes the right output shaft 60R as discussed below.

In the present description, the pivot turn signifies turning using the crawler belt on the other side as an axis due to one of the left and right output shafts 60L, 60R being substantially or completely stopped while the other is rotating.

As illustrated in FIG. 2, the right steering clutch 40R has a plurality of clutch plates 41, a plurality of clutch disks 42, and a clutch piston 43.

The clutch plates 41 are attached to a right clutch gear 91R. The clutch disks 42 are fixed to the right sun gear 33R. The clutch plates 41 and the clutch disks 42 are disposed alternately in the axial direction.

When the clutch piston 43 moves in the left direction accompanying the supply of hydraulic fluid, the clutch plates 41 and the clutch disks 42 are pressed together and the right steering clutch 40R is engaged. Consequently, the right sun gear 33R of the right planetary gear mechanism 30R and the right clutch gear 91R of the motor power transmitting section 90 are joined together.

When the clutch piston 43 moves in the right direction accompanying the discharge of hydraulic fluid, the clutch plates 41 and the clutch disks 42 separate and the right steering clutch 40R is released. Consequently, the right sun gear 33R of the right planetary gear mechanism and the right clutch gear 91R of the motor power transmitting section move away from each other.

The left steering clutch 40L has the same configuration as the right steering clutch 40R.

[Steering Brake]

The left and right steering brakes 50L, 50R are driven by the supply of the hydraulic fluid. The left and right steering brakes 50L, are configured by wet multiplate clutches that are able to be engaged and released. In the present embodiment, the left and right steering brakes 50L, 50R are negative-type hydraulic brakes. The left and right steering brakes 50L, 50R are completely engaged when hydraulic fluid is not supplied, are partially engaged when the pressure of the supplied hydraulic fluid is less than a predetermined value, and are released when the pressure of the supplied hydraulic fluid is equal to or greater than the predetermined value. When the left and right steering brakes 50L, 50R are engaged (complete engagement or partial engagement), a braking force is produced on the left and right steering brakes 50L, 50R.

The pressure of the hydraulic fluid supplied to the left and right steering brakes 50L, 50R is controlled by left and right brake control valves 28L, 28R. The left and right brake control valves 28L, 28R are driven in response to a brake pressure instruction inputted from the controller 100.

The left and right steering brakes 50L, 50R respectively brake the rotation of the left and right output shafts 60L, 60R.

Specifically, when the left steering brake 50L is engaged, braking is applied to the rotation of the left output shaft 60L and the rotation of the left sprocket 2L is reduced. Conversely, when the right steering brake 50R is engaged, braking is applied to the rotation of the right output shaft 60R and the rotation of the right sprocket 2R is reduced.

As illustrated in FIG. 2, the right steering brake 50R has a rotating member 51, a brake housing 52, a plurality of fixing plates 53, a plurality of brake disks 54, and a brake piston 55.

The rotating member 51 is fixed to the right output shaft and rotates with the right output shaft 60R. The brake housing 52 is fixed to the rotating member 51. The fixing plates 53 are attached to the brake housing 52. The brake disks 54 are fixed to the rotating member 51. The fixing plates 53 and the brake disks 54 are disposed alternately in the axial direction.

When the brake piston 55 moves in the left direction accompanying the filling of the hydraulic fluid, the fixing plates 53 and the brake disks 54 separate and the right steering brake 50R is released. Conversely, when the brake piston 55 moves in the right direction accompanying the discharge of the hydraulic fluid, the fixing plates 53 and the brake disks 54 are pressed together and the braking force of the right steering brake 50R is produced.

The left steering brake 50L has the same configuration as the right steering brake 50R.

[Turning Motor]

The turning motor 80 is driven by power from the engine 10. The turning motor 80 rotates in the forward rotating direction or the reverse rotating direction. The rotating direction and the rotation speed of the turning motor 80 are controlled by the controller 100. The rotation speed of the turning motor 80 changes from 0% to 100% (maximum value) in response to the power transmitted from the engine 10.

The rotational power of the turning motor 80 is transmitted through the motor power transmitting section 90 to the left and right steering clutches 40L, 40R. The turning motor 80 causes the left and right steering clutches 40L, 40R to rotate so that a rotation speed difference is produced between the left and right output shafts 60L, 60R. For example, when the bulldozer 1 turns slowly to the right, the turning motor 80 causes the left and right steering clutches 40L, 40R to rotate in opposite directions and the rotation speed of the left output shaft 60L becomes higher than the rotation speed of the right output shaft 60R. When the bulldozer 1 is making a pivot turn to the right, although the turning motor 80 causes the left and right steering clutches 40L, 40R to rotate in opposite directions, the right steering clutch 40R is released and the right steering brake 50R is braked whereby the right output shaft 60R does not rotate and only the left output shaft 60L rotates.

[Motor Power Transmitting Section]

The motor power transmitting section 90 is disposed between the turning motor 80 and the left and right steering clutches 40L, 40R. The motor power transmitting section 90 transmits the rotational power of the turning motor 80 to the left and right steering clutches 40L, 40R.

The motor power transmitting section 90 has left and right clutch gears 91L, 91R, a first transfer gear 92, an auxiliary shaft 93, a second transfer gear 94, an idler gear 95, and a pinion gear 96.

The left and right clutch gears 91L, 91R are able to disengage from the left and right sun gears 33L, 33R by means of the left and right steering clutches 40L, 40R. The left and right clutch gears 91L, 91R are able to rotate about the axial direction of the input shaft 26. The left clutch gear 91L meshes with the idler gear 95. The right clutch gear 91R is coupled to the first transfer gear 92, the auxiliary shaft 93, and the second transfer gear 94 through the idler gear 95. The left and right clutch gears 91L, 91R rotate in opposite directions when the turning motor 80 rotates.

The idler gear 95 meshes with the left clutch gear 91L, the second transfer gear 94, and the pinion gear 96. The idler gear 95 is able to rotate about the axial direction of the input shaft 26.

The pinion gear 96 meshes with the idler gear 95. The pinion gear 96 is able to rotate about a pinion shaft 96a. The pinion gear 96 rotates due to the rotational power of the turning motor 80 that is transmitted through the pinion shaft 96a.

[Controller]

The controller 100 controls the rotation speed of the engine 10 and the velocity stage clutches and the direction stage clutches of the transmission 23 in order to cause the bulldozer 1 to travel.

The controller 100 controls the left and right steering clutches 40L, 40R, the left and right steering brakes 50L, 50R, and the turning motor 80 thereby causing the bulldozer 1 to travel in any of a "straight travel mode," a "slow turn mode," and a "pivot turn mode."

The controller 100 is connected to a steering lever 35 used for steering operations of the bulldozer 1. The steering lever 35 can be operated in a left turning direction P2 or a right turning direction P3 using a neutral position P1 as a point of reference.

The controller 100 switches between the "straight travel mode," the "slow turn mode," and the "pivot turn mode" in response to the operating amount of the steering lever 35.

The controller 100 causes the bulldozer 1 to travel in the straight travel mode when the operating amount of the steering lever 35 is equal to or less than a first predetermined amount TH1. When the operating amount of the steering lever 35 is greater than the first predetermined amount TH1 and less than a second predetermined amount TH2, the controller 100 causes the bulldozer 1 to turn in the slow turn mode. When the operating amount of the steering lever 35 is equal to or greater than the second predetermined amount TH2, the controller 100 causes the bulldozer 1 to turn in the pivot turn mode.

The second predetermined amount TH2 is greater than the first predetermined amount TH1. The first and second predetermined amounts TH1 and TH2 can be set to desired values. The first predetermined amount TH1 may also be zero.

Straight Travel Mode

In the straight travel mode, the controller 100 controls the left and right clutch control valves 27L, 27R to cause the left and right steering clutches 40L, 40R to completely engage.

In the straight travel mode, the controller 100 controls the left and right brake control valves 28L, 28R to cause the left and right steering brakes 50L, 50R to release.

In the straight travel mode, the controller 100 stops the turning motor 80.

Slow Turn Mode

In the slow turn mode, the controller 100 controls the left and right clutch control valves 27L, 27R to cause the left and right steering clutches 40L, 40R to engage (typically to be completely engaged).

In the slow turn mode, the controller 100 controls the left and right brake control valves 28L, 28R to cause the left and right steering brakes 50L, 50R to release.

In the slow turn mode, the controller 100 drives the turning motor 80 so that the rotation speed of an inside output shaft 601N is lower than the rotation speed of an outside output shaft $60_{OUT}$ in correspondence to an increase in the operating amount of the steering lever 35.

The inside output shaft $60_{IN}$ is the output shaft corresponding to the operating direction (that is, the turning direction) of the steering lever 35 among the left and right output shafts 60L, 60R. The outside output shaft $60_{OUT}$ is the output shaft opposite to the operating direction of the steering lever 35 among the left and right output shafts 60L, 60R.

The controller 100 increases the rotation speed of the turning motor 80 in correspondence to an increase in the operating amount of the steering lever 35. For example, the controller 100 may increase the rotation speed of the turning motor 80 gradually so as to be proportional to the operating amount of the steering lever 35, or may increase the rotation speed of the turning motor 80 in stages in response to the operating amount of the steering lever 35.

While the rotation speed of the turning motor 80 when the operating amount of the steering lever 35 is the second predetermined amount TH2 is not limited in particular so long as the value is sufficiently high, it is preferable that the rotation speed is at least 90%, more preferable that the rotation speed is at least 95%, and most preferable that the rotation speed is 100% (maximum value).

Pivot Turn Mode

In the pivot turn mode, the controller 100 controls the left and right clutch control valves 27L, 27R to cause the inside steering clutch $40_{IN}$ to release and cause the outside steering clutch $40_{OUT}$ to engage (typically to be completely engaged).

The inside steering clutch $40_{IN}$ is the steering clutch corresponding to the operating direction of the steering lever 35 among the left and right steering clutches 40L, 40R. The outside steering clutch $40_{OUT}$ is the steering clutch opposite to the operating direction of the steering lever 35 among the left and right steering clutches 40L, 40R.

In the pivot turn mode, the controller 100 controls the left and right brake control valves 28L, 28R to cause the inside steering brake $50_{IN}$ to brake and cause the outside steering brake $50_{OUT}$ to release.

The inside steering brake $50_{IN}$ is the steering brake corresponding to the operating direction of the steering lever 35 among the left and right steering brakes 50L, 50R. The outside steering brake $50_{OUT}$ is the steering brake opposite to the operating direction of the steering lever 35 among the left and right steering brakes 50L, 50R.

In the pivot turn mode, the controller 100 maintains the rotation speed of the turning motor 80 at about the same rotation speed as in the slow turn mode. While the rotation speed of the turning motor is not limited in particular so long as the value is sufficiently high, it is preferable that the rotation speed is at least 90%, more preferable that the rotation speed is at least 95%, and most preferable that the rotation speed is 100%.

Switching from Slow Turn Mode to Pivot Turn Mode

When switching from the slow turn mode to the pivot turn mode, the controller 100 transitions the inside steering brake $50_{IN}$ from the released state to the braking state and transitions the inside steering clutch $40_{IN}$ from the engaged state to the released state.

Figure 4:
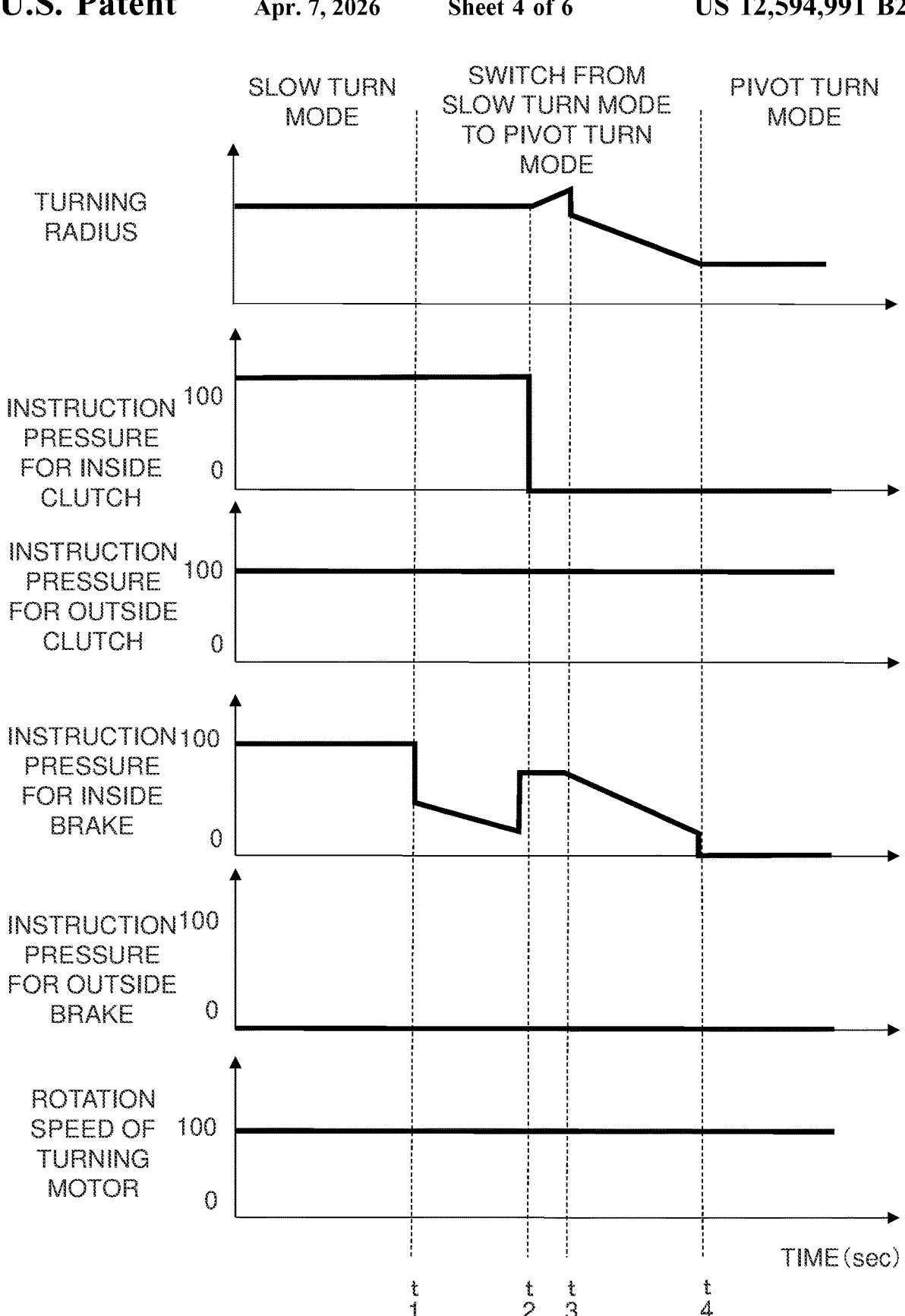
FIG. 4 is a graph illustrating examples of states of the bulldozer when switching from a slow turn mode to a pivot turn mode.

FIG. 4 is a graph illustrating examples of states of the bulldozer 1 when switching from the slow turn mode to the pivot turn mode.

The controller 100 changes a brake pressure instruction to be output to the inside brake control valve 281N corresponding to the inside steering brake 50$_{IN}$ from a switching start point t1 to a switching end point t4 in order to transition the inside steering brake 50$_{IN}$ from the released state to the engaged state. The brake pressure indicated by the brake pressure instruction is changed from the maximum value before the switching start point t1 to the minimum value at and after the switching end point t4. The switching from the slow turn mode to the pivot turn mode is started at the switching start point t1 and is completed at the switching end point t4.

The discharge of hydraulic fluid starts at the switching start point t1 in the inside steering brake 50$_{IN}$, and the brake piston 55 starts to move at a brake braking start point t3, and the movement of the brake piston 55 is completed at the switching end point t4. Therefore, the braking force of the inside steering brake 50$_{IN}$ is not produced from the switching start point t1 to the brake braking start point t3, and gradually increases from the brake braking start point t3 up to the switching end point t4.

In addition, the controller 100 changes the clutch pressure instruction to be outputted to the inside clutch control valve 27$_{IN}$ corresponding to the inside steering clutch 40$_{IN}$ in order to transition the inside steering clutch 40$_{IN}$ from the engaged state to the released state. While the timing when the controller 100 starts to change the clutch pressure instruction is not depicted in FIG. 4, the clutch pressure indicated by the clutch pressure instruction is changed to the minimum value at a clutch release point t2.

The movement of the clutch piston 43 is completed at the clutch release point t2 in the inside steering clutch 40$_{IN}$. Therefore, the inside steering clutch 40$_{IN}$ is released at or after the clutch release point t2 after the engagement (including complete engagement and partial engagement) up to the clutch release point t2.

The inside steering clutch 40$_{IN}$ and the inside steering brake 50$_{IN}$ are both released during the period from the clutch release point t2 to the brake braking start point t3. As a result, the straight travel phenomenon is produced with the corotation of the inside crawler belt 31N due to driving of the outside crawler belt 3$_{OUT}$ corresponding to the turning direction among the left and right crawler belts 3L, 3R, and the turning radius temporarily increases slightly.

As described above, when switching from the slow turn mode to the pivot turn mode, the controller 100 maintains the engagement of the inside steering clutch 40$_{IN}$ over a predetermined period (t3-t1) from the switching start point t1 when switching is started. Therefore, in comparison to when the inside steering clutch 40$_{IN}$ is released before the switching start point t1, the period in which both the inside steering clutch 40$_{IN}$ and the inside steering brake 50$_{IN}$ are released can be shortened. Therefore, an increase in the turning radius due to the straight travel phenomenon with the corotation of the inside crawler belt 3$_{IN}$ due to driving of the outside crawler belt 3$_{OUT}$ can be suppressed.

In addition, when switching from the slow turn mode to the pivot turn mode, the controller 100 releases the inside steering clutch 40$_{IN}$ before the brake braking start point t3 when the generation of the braking force of the inside steering brake 50$_{IN}$ starts. Therefore, the occurrence of the dragging phenomenon on the inside steering brake 50$_{IN}$ can be suppressed.

Switching from Pivot Turn Mode to Slow Turn Mode

When switching from the pivot turn mode to the slow turn mode, the controller 100 transitions the inside steering clutch 40$_{IN}$ from the released state to the engaged state and transitions the inside steering brake 50$_{IN}$ from the braking state to the released state.

Figure 5:
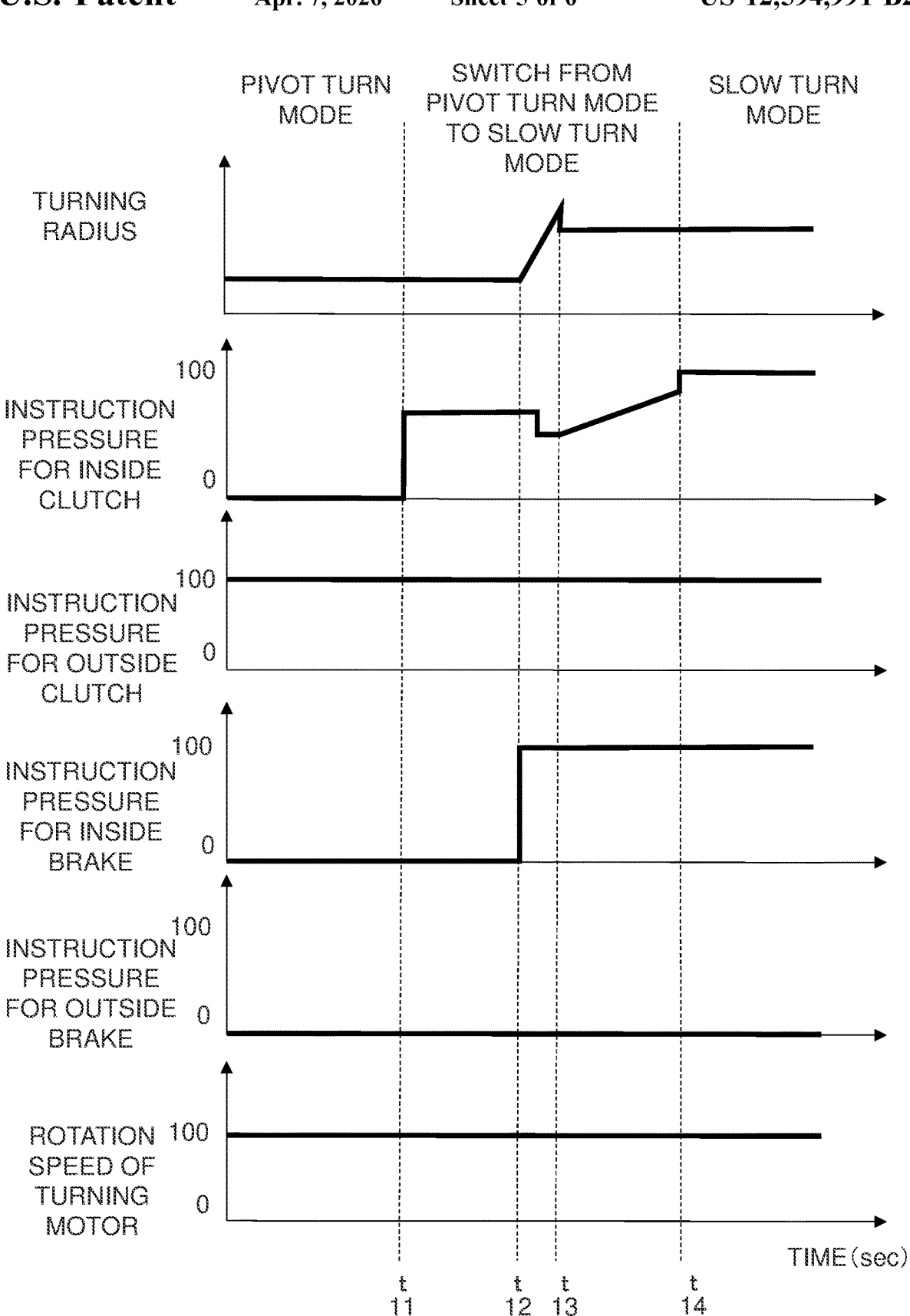
FIG. 5 is a graph illustrating examples of states of the bulldozer when switching from the pivot turn mode to the slow turn mode.

FIG. 5 is a graph illustrating examples of states of the bulldozer 1 when switching from the pivot turn mode to the slow turn mode.

The controller 100 changes the clutch pressure instruction to be outputted to the inside clutch control valve 27$_{IN}$ corresponding to the inside steering clutch 40$_{IN}$ in order to transition the inside steering clutch 40$_{IN}$ from the engaged state to the released state, from a switching start point t11 up to a switching end point t14. The clutch pressure indicated by the clutch pressure instruction is changed from the maximum value before the switching start point t11 to the minimum value at and after the switching end point t14. The switching from the pivot turn mode to the slow turn mode is started at the switching start point t11 and is completed at the switching end point t14.

In the inside steering clutch 40$_{IN}$, the filling of hydraulic fluid starts at the switching start point t11 and the clutch piston 43 starts to move at a clutch engagement start point t13, and the movement of the clutch piston 43 is completed at the switching end point t14. Therefore, the inside steering clutch 40$_{IN}$ is released from the switching start point t11 up to the clutch engagement start point t13, and is gradually engaged from the clutch engagement start point t13 up to the switching end point t14.

In addition, the controller 100 changes the brake pressure instruction to be output to the inside brake control valve 281N corresponding to the inside steering brake 50$_{IN}$ in order to transition the inside steering brake 50$_{IN}$ from the braking state to the released state. While the timing when the controller 100 starts to change the brake pressure instruction is not depicted in FIG. 4, the brake pressure indicated by the brake pressure instruction is changed to the maximum value at a brake release point t12.

In the inside steering brake 50$_{IN}$, the movement of the brake piston 55 is completed at the brake release point t12. Therefore, the inside steering brake 50$_{IN}$ is released at or after the brake release point t12 after the braking force is produced up to the brake release point t12.

The inside steering clutch 40$_{IN}$ and the inside steering brake 50$_{IN}$ are both released during the period from the brake release point t12 to the clutch engagement start point t13. As a result, the turning radius temporarily increases slightly due to the straight travel phenomenon produced with the corotation of the inside crawler belt 31N due to driving of the outside crawler belt 3$_{OUT}$.

As described above, when switching from the pivot turn mode to the slow turn mode, the controller 100 maintains the braking of the inside steering brake 50$_{IN}$ over a predetermined period (t33-t11) from the switching start point t11 when switching is started. Therefore, in comparison to when the inside steering brake 50$_{IN}$ is released before the switching start point t11, the period in which both the inside steering clutch 40$_{IN}$ and the inside steering brake 50$_{IN}$ are released can be shortened. Therefore, an increase in the turning radius due to the straight travel phenomenon with the corotation of the inside crawler belt 31N due to driving of the outside crawler belt 3$_{OUT}$ can be suppressed.

In addition, when switching from the pivot turn mode to the slow turn mode, the controller 100 releases the inside steering brake 50$_{IN}$ before the clutch engagement start point t13 when the engagement of the inside steering clutch 40$_{IN}$ starts. Therefore, the occurrence of the dragging phenomenon on the inside steering brake $50_{IN}$ can be suppressed.

Modified Examples of the Embodiment

The present disclosure is not limited to the above embodiment and various changes and modifications may be made without departing from the spirit of the invention.

Modified Example 1

While the controller 100 in the above embodiment switches from the slow turn mode to the pivot turn mode and switches from the pivot turn mode to the slow turn mode in response to the operating amount of the steering lever 35, the present invention is not limited in this way. The controller 100 may switch from the slow turn mode to the pivot turn mode in response to the operating amount of the steering lever 35 being greater than the first predetermined amount TH1 and in response to the reception of a pivot turn instruction from the operator. Furthermore, the controller 100 may switch from the pivot turn mode to the slow turn mode in accordance with having not received a pivot turn instruction from the operator during the pivot turn mode.

Figure 6:
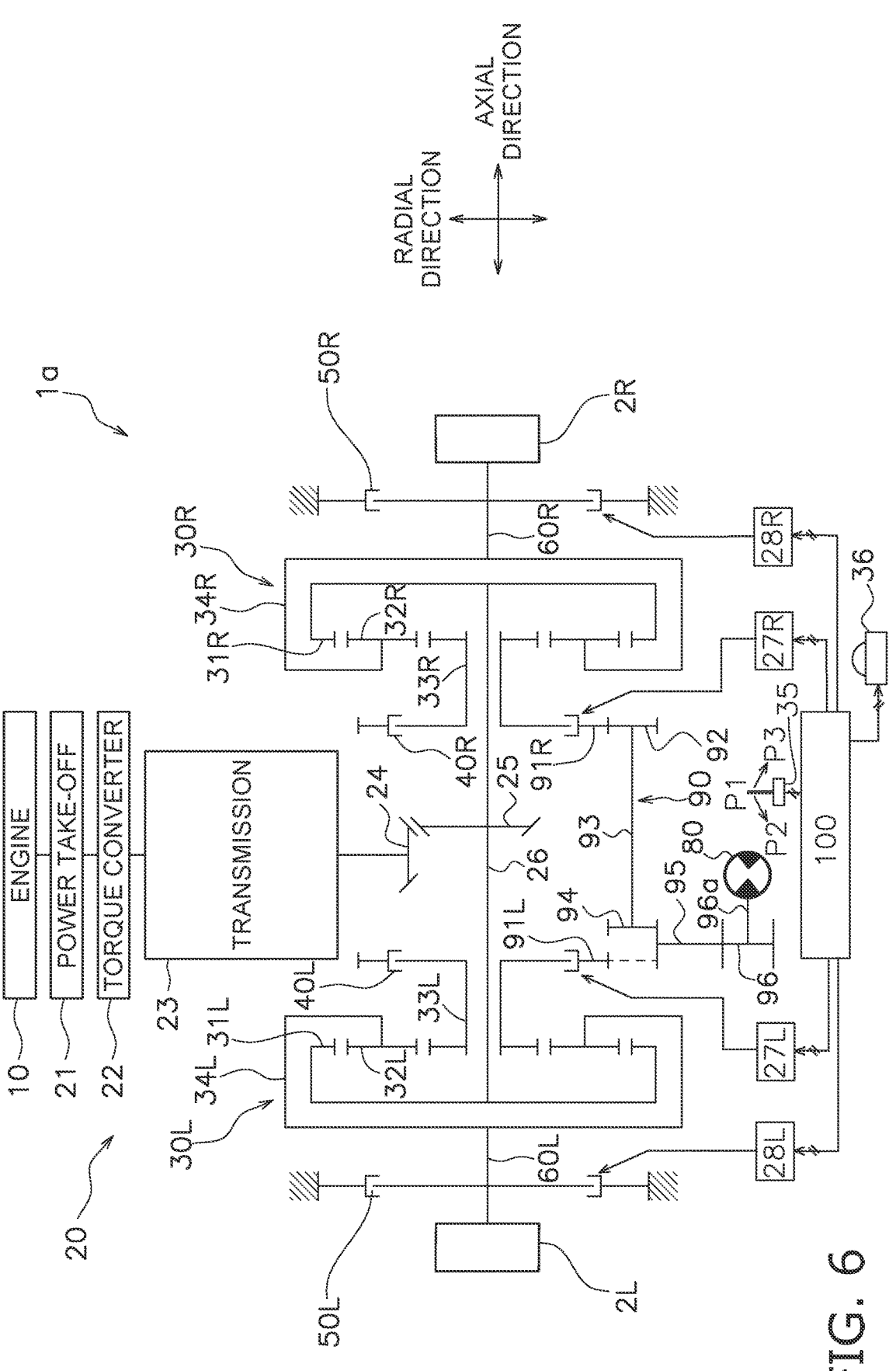
FIG. 6 is an outline system configuration view of the power transmission system of the bulldozer according to a first modified example.

FIG. 6 is an outline system configuration view of the power transmission system of a bulldozer 1a according to the present modified example. The bulldozer 1a is provided with the same configuration as the bulldozer 1 according to the above embodiment except that a pivot turn button 36 is provided.

The pivot turn button 36 is connected to the controller 100. The pivot turn button 36 receives the pivot turn instruction from an operator. When the pivot turn button 36 is pressed by the operator, the pivot turn button 36 transmits the pivot turn instruction to the controller 100. The pivot turn instruction may be transmitted to the controller 100 while the pivot turn button 36 is being pressed by the operator, or the pivot turn instruction may be continuously transmitted to the controller 100 until the pivot turn button 36 is pressed again by the operator.

The controller 100 sets the travel mode of the bulldozer 1 to the straight travel mode as explained in the above embodiment when the operating amount of the steering lever 35 is equal to or less than the first predetermined amount TH1.

The controller 100 sets the travel mode of the bulldozer 1 to the slow turn mode when the operating amount of the steering lever 35 is greater than the first predetermined amount TH1 and no pivot turn instruction has been received. The control by the controller 100 in the slow turn mode is as explained in the above embodiment.

The controller 100 sets the travel mode of the bulldozer 1 to the pivot turn mode when the operating amount of the steering lever 35 is greater than the first predetermined amount TH1 and the pivot turn instruction has been received. The control by the controller 100 in the pivot turn mode is as explained in the above embodiment.

The control by the controller 100 when switching from the slow turn mode to the pivot turn mode and switching from the pivot turn mode to the slow turn mode is as explained in the above embodiment.

Modified Example 2

While the left and right steering clutches 40L, 40R are positive-type hydraulic clutches in the above embodiment, the left and right steering clutches 40L, 40R may also be negative-type hydraulic clutches.

Modified Example 3

While the left and right steering brakes 50L, 50R are negative-type hydraulic brakes in the above embodiment, the left and right steering brakes 50L, 50R may also be positive-type hydraulic brakes.

Modified Example 4

While the controller 100 in the above embodiment executes the control for suppressing an increase in the turning radius in both cases of switching from the slow turn mode to the pivot turn mode and switching from the pivot turn mode to the slow turn mode, said control may be executed for only one of the cases of the switching.

Modified Example 5

While the left and right output shafts 60L, 60R are respectively coupled to the left and right sprockets 2L, 2R in the above embodiment, left and right final drive gears may be respectively interposed between the left and right output shafts 60L, 60R and the left and right sprockets 2L, 2R.

Modified Example 6

While the controller 100 in the above embodiment drives the turning motor 80 in the pivot turn mode, the present invention is not limited in this way. The controller 100 may not drive the turning motor 80 in the pivot turn mode.

The invention claimed is:

1. A crawler-type work machine comprising:

left and right planetary gear mechanisms disposed between an input shaft and left and right output shafts;

left and right steering clutches configured to be rotatable about the input shaft and switch between transmitting and blocking rotational power from the input shaft to the left and right output shafts by means of the left and right planetary gear mechanisms;

left and right steering brakes configured to brake the left and right output shafts;

a turning motor configured to cause the left and right steering clutches to rotate so that a rotation speed difference is produced between the left and right output shafts;

a controller configured to control the left and right steering clutches, the left and right steering brakes, and the turning motor thereby causing the crawler-type work machine to turn in either a slow turn mode or a pivot turn mode, the left and right steering clutches and the left and right steering brakes being driven by supplying hydraulic fluid;

in the slow turn mode, the controller causing the left and right steering clutches to engage, causing the left and right steering brakes to release, and driving the turning motor so that, among the left and right output shafts, a rotation speed of an inside output shaft corresponding to the turning direction becomes lower than a rotation speed of an outside output shaft opposite to the turning direction;

in the pivot turn mode, the controller causing an inside steering clutch corresponding to the turning direction among the left and right steering clutches to release, and causing an inside steering brake corresponding to the turning direction among the left and right steering brakes to brake; and during at least one of switching from the slow turn mode to the pivot turn mode and switching from the pivot turn mode to the slow turn mode, the controller causing the inside steering clutch to engage or causing the inside steering brake to brake over a predetermined period after switching starts.

2. The crawler-type work machine according to claim 1, wherein when switching from the slow turn mode to the pivot turn mode, the controller causes the inside steering clutch to release after the start of switching and before a generation of the braking force of the inside steering brake starts.

3. The crawler-type work machine according to claim 1, wherein when switching from the pivot turn mode to the slow turn mode, the controller causes the inside steering brake to release after the start of switching and before the inside steering clutch starts to be engaged.

4. The crawler-type work machine according to claim 1, wherein the controller drives the turning motor in the pivot turn mode.

5. The crawler-type work machine according to claim 1, wherein each of the left and right planetary gear mechanisms includes a ring gear coupled to the input shaft, a sun gear rotatably attached to the input shaft and coupled to the respective steering clutch, a planetary gear disposed between the ring gear and the sun gear, and a carrier coupled to the planetary gear and the output shaft.

6. The crawler-type work machine according to claim 5, further comprising left and right clutch gears configured to be able to connect and disconnect with the sun gear of the respective left and right planetary gear mechanisms through the left and right steering clutches, and to be rotatable in opposite directions, and an idler gear configured to transmit rotational power of the turning motor to the left and right clutch gears.

7. The crawler-type work machine according to claim 2, wherein the controller drives the turning motor in the pivot turn mode.

8. The crawler-type work machine according to claim 7, wherein each of the left and right planetary gear mechanisms includes a ring gear coupled to the input shaft, a sun gear rotatably attached to the input shaft and coupled to the respective steering clutch, a planetary gear disposed between the ring gear and the sun gear, and a carrier coupled to the planetary gear and the output shaft.

9. The crawler-type work machine according to claim 8, further comprising left and right clutch gears configured to be able to connect and disconnect with the sun gear of the respective left and right planetary gear mechanisms through the left and right steering clutches, and to be rotatable in opposite directions, and an idler gear configured to transmit rotational power of the turning motor to the left and right clutch gears.

10. The crawler-type work machine according to claim 2, wherein when switching from the pivot turn mode to the slow turn mode, the controller causes the inside steering brake to release after the start of switching and before the inside steering clutch starts to be engaged.

11. The crawler-type work machine according to claim 10, wherein the controller drives the turning motor in the pivot turn mode.

12. The crawler-type work machine according to claim 11, wherein each of the left and right planetary gear mechanisms includes a ring gear coupled to the input shaft, a sun gear rotatably attached to the input shaft and coupled to the respective steering clutch, a planetary gear disposed between the ring gear and the sun gear, and a carrier coupled to the planetary gear and the output shaft.

13. The crawler-type work machine according to claim 12, further comprising left and right clutch gears configured to be able to connect and disconnect with the sun gear of the respective left and right planetary gear mechanisms through the left and right steering clutches, and to be rotatable in opposite directions, and an idler gear configured to transmit rotational power of the turning motor to the left and right clutch gears.

* * * * *